United States Patent [19]
Leclerc et al.

[11] Patent Number: 6,081,559
[45] Date of Patent: Jun. 27, 2000

[54] APPARATUS FOR DETECTING THE PRESENCE OR THE ABSENCE OF A DIGITALLY MODULATED CARRIER, A CORRESPONDING RECEIVER, AND A CORRESPONDING METHOD

[75] Inventors: Gérard Leclerc, Osny; Denis Blavette, Saint Ouen l'Aumone; Didier Lemaitre, Jouy le Moutier, all of France

[73] Assignee: Alcatel Espace, Nanterre Cedex, France

[21] Appl. No.: 08/565,045

[22] Filed: Nov. 30, 1995

[30] Foreign Application Priority Data

Dec. 2, 1994 [FR] France ................................. 94 14528

[51] Int. Cl.⁷ .......................... H04L 27/14; H04L 27/16; H04L 27/22
[52] U.S. Cl. ............................. 375/326; 375/340; 327/18
[58] Field of Search ................................. 375/316, 326, 375/327, 328, 324, 340; 329/304, 307, 306, 302; 327/18, 20

[56] References Cited

U.S. PATENT DOCUMENTS

| | | | |
|---|---|---|---|
| 3,835,404 | 9/1974 | Nakamura et al. | 375/326 |
| 4,780,887 | 10/1988 | Otani et al. | 375/326 |
| 4,871,975 | 10/1989 | Nawata et al. | 375/326 |
| 4,890,302 | 12/1989 | Muilwijk | 375/326 |
| 5,012,492 | 4/1991 | Sexton et al. | 375/327 |
| 5,247,543 | 9/1993 | Tsuda et al. | 375/326 |
| 5,412,687 | 5/1995 | Sutton et al. | 375/202 |
| 5,563,908 | 10/1996 | Kaku et al. | 375/222 |

FOREIGN PATENT DOCUMENTS 009853  9/1993  European Pat. Off. .

OTHER PUBLICATIONS

Patent Abstracts of Japan, vol. 13, No. 413 (E–820) Sep. 12, 1989 corresponding to JP–A–01 152811 (Akai Electric Co. Ltd) dated Jun. 15, 1989.

*Primary Examiner*—Chi H. Pham
*Assistant Examiner*—Bryan Webster
*Attorney, Agent, or Firm*—Sughrue, Mion, Zinn, Macpeak & Seas, PLLC

[57] ABSTRACT

The invention relates to apparatus for detecting the presence or the absence of a signal carrier wave received by a receiver. The carrier wave is modulated by a digital signal at a symbol clock frequency. According to the invention, the apparatus includes:

- a non-linear circuit receiving the received signal or the received signal after it has been frequency transposed, the non-linear circuit supplying in particular a signal whose frequency corresponds to the symbol clock frequency;
- a narrow-band filter centered on the symbol clock frequency and supplying a filtered signal;
- detection means for detecting the filtered signal and for supplying a detection signal; and
- comparator means for comparing the detection signal with a reference value, the output signal from the comparator means constituting a signal indicating the presence or the absence of the carrier wave.

The invention is particularly applicable to a receiver including automatic gain control apparatus placed upstream, and the indicator signal may optionally be applied to automatic frequency control apparatus.

9 Claims, 2 Drawing Sheets

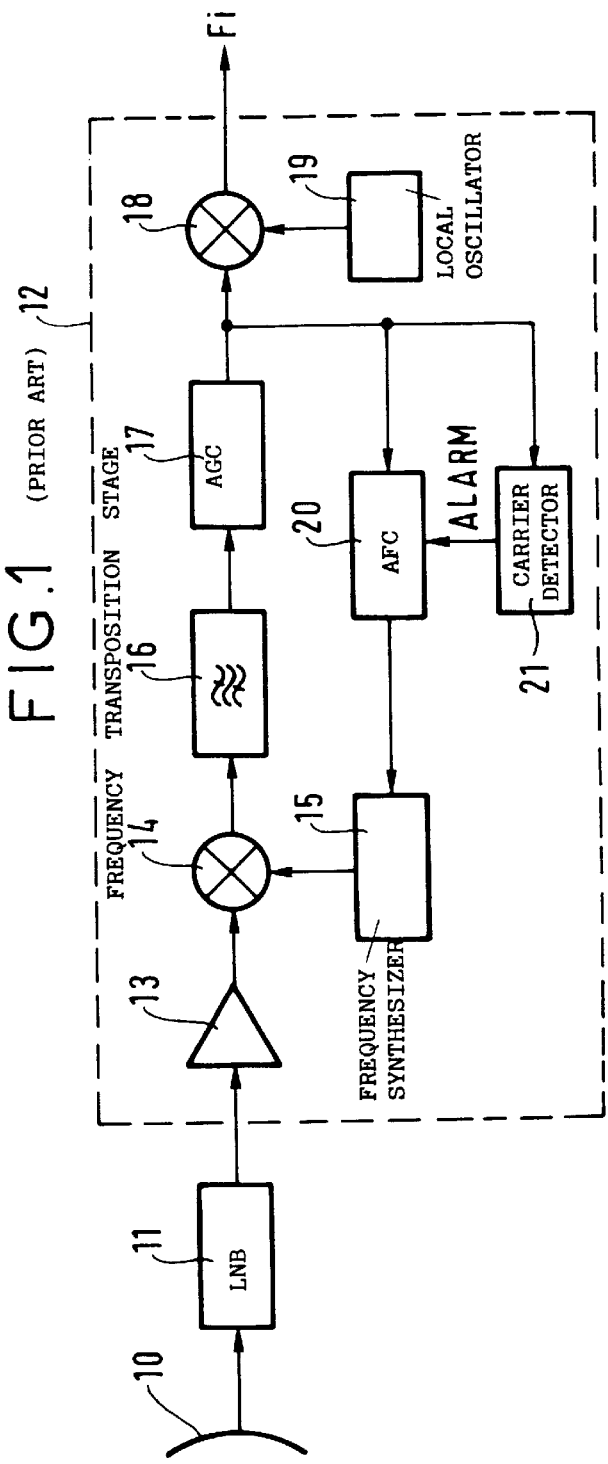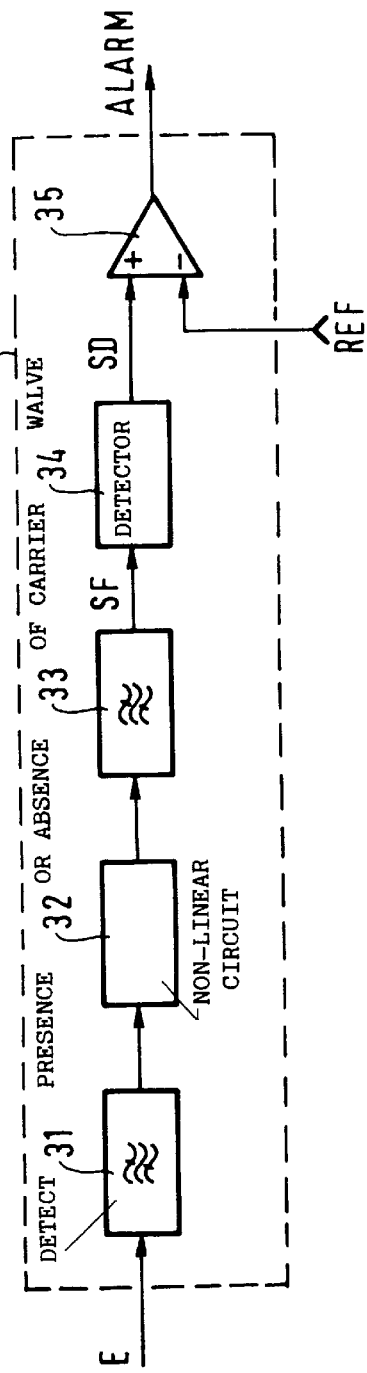

APPARATUS FOR DETECTING THE PRESENCE OR THE ABSENCE OF A DIGITALLY MODULATED CARRIER, A CORRESPONDING RECEIVER, AND A CORRESPONDING METHOD

FIELD OF THE INVENTION

The invention relates to digital telecommunications, in particular by satellite, and it relates more precisely to apparatus for detecting the presence or the absence of a signal carrier wave received by a receiver, said carrier wave being modulated by a digital signal at a symbol clock frequency. The invention is applicable to any type of digital modulation, e.g. to phase shift modulation (M-PSK: phase shift keying with M states) or to amplitude and phase modulation (M-APSK: amplitude and phase shift keying with M states) and to such modulation as used in particular in time division multiple access (TDMA) telecommunications systems or in frequency division multiple access (FDMA) telecommunications systems.

BACKGROUND OF THE INVENTION

In order to illustrate an example of an application of the invention, a description is given below of a modem used in reception in a satellite transmission system.

FIG. 1 is a block diagram of a reception system for satellite transmission, the receiver used including a detector for detecting the presence or the absence of a carrier.

The reception system shown in FIG. 1 includes an antenna 10 receiving a microwave signal constituted by a carrier in KU band (12 GHz) modulated by a digital signal, e.g. in 4-PSK. The signal picked up by the antenna 10 is applied to a low noise block (LNB) converter 11 conventionally comprising a low noise amplifier followed by apparatus for performing transposition into intermediate frequency. For example, the output signal from the LNB 11 may be in BIS band (950 MHz to 1,750 MHz) and it is applied to a frequency transposition stage 12 of the modem.

The stage 12 includes an amplifier 13 followed by a mixer 14 receiving a transposition signal from a frequency synthesizer 15. The mixer 14 and the frequency synthesizer 15 constitute a first frequency transposition stage. The output signal from the mixer 14 has a fixed frequency, as explained below, and it is applied to a band-pass filter 16 followed by automatic gain control (AGC) apparatus 17. The output signal from the AGC apparatus 17 is applied to a second frequency transposition stage constituted by a mixer 18 driven by a local oscillator 19. The output signal from the mixer 18 is an intermediate frequency (IF) signal at 70 MHz. This signal is then applied to the demodulation stage of the receiver, which stage serves to restore the transmitted 4-PSK symbols.

The output signal from the AGC apparatus 17 is also applied both to automatic frequency control (AFC) apparatus 20 driving the frequency synthesizer 15, and to apparatus 21 for detecting the presence or the absence of a carrier. The AFC apparatus 20 serves to compensate any frequency drift due to the frequency transposition apparatus included in the LNB 11. The frequency transposition apparatus commonly used in such an LNB includes a local oscillator constituted by a resonator. Such an oscillator may exhibit considerable frequency drift around its central frequency, which is why it is necessary to use AFC apparatus downstream so as to guarantee that the frequency at the output of the mixer 14 is constant.

The apparatus 21 for detecting the presence or the absence of a carrier serves to inhibit operation of the AFC apparatus 20 when absence of carrier is detected so that the synthesizer 15, which is advantageously broad-band, does not latch onto an intermediate frequency corresponding to that of an adjacent channel. In satellite transmissions, a plurality of carriers are used simultaneously at the same symbol rate R, and, to comply with the Intelsat Standard IESS-308, two adjacent channels must be capable of having bands that overlap each other in part (difference between carriers equal to 0.7 R). Furthermore, one of the channels adjacent to the received channel must be capable of having amplitude of up to 7 dB more than that of the received channel.

Under these circumstances, if the AFC apparatus 20 is not inhibited when the carrier disappears, e.g. as a result of temporary selective fading, the AFC apparatus, which is broad-band, re-synchronizes the synthesizer 15 on one of the adjacent channels. The carrier cannot then be subsequently recovered and the link is cut off. That is why the apparatus 21 for detecting the presence or the absence of a carrier generates an alarm signal (ALARM) inhibiting operation of the AFC apparatus 20 when absence of carrier is detected.

In known manner, the presence or the absence of a carrier is detected by detecting the IF level, i.e. the energy of the signal output by the AGC apparatus 17 is compared with a reference value. If the reference value is exceeded, the carrier is considered to be present, and if the reference value is not exceeded, the carrier is considered to be absent.

Unfortunately, detecting a carrier by means of IF detection poses a problem when the dynamic range of the AGC apparatus 17 placed upstream is greater than the signal-to-noise ratio of the received signal. In the absence of carrier, the AGC apparatus 17 amplifies the noise level to the level of the absent carrier, and the alarm signal is not generated. In which case, the AFC apparatus 20 is not inhibited and the synthesizer 15 latches onto the intermediate frequency corresponding to an adjacent channel.

Moreover, even in the absence of adjacent channels, absence of detection of carrier loss can have considerable effects on receiver operation. By way of example, in a TDMA transmission application, the receiver receives information packets spaced apart over time. In order to demodulate the information, the receiver must know the envelope of the received signal, i.e. the moments at which the packets start and end. In the state of the art, this timing information is obtained in predictive manner. The drawback with that is that if packet transmission stops, e.g. as a result of transmitter breakdown, the AGC apparatus amplifies noise, the IF carrier-presence detector does not operate, and the AFC apparatus is not inhibited. As a result, the TDMA system loses synchronization.

OBJECTS AND SUMMARY OF THE INVENTION

A particular object of the present invention is to remedy those drawbacks.

More precisely, an object of the invention is to provide apparatus that supplies reliable information indicating the presence or the absence of a received signal carrier wave. In particular, this information must not be dependent on AGC apparatus placed upstream that amplifies noise in the absence of a carrier.

The invention achieves this object and others that appear below by providing apparatus that includes:
  a non-linear circuit receiving the received signal or the received signal after it has been frequency transposed, the non-linear circuit supplying in particular a signal whose frequency corresponds to the symbol clock frequency;

a narrow-band filter centered on the symbol clock frequency and supplying a filtered signal;

detection means for detecting the filtered signal and for supplying a detection signal; and comparator means for comparing the detection signal with a reference value, the output signal from said comparator means constituting a signal indicating the presence or the absence of the carrier wave.

Thus, the presence or the absence of the carrier wave is detected by detecting the clock spectrum line generated by the non-linear circuit. The presence or the absence of a digitally modulated carrier corresponds respectively to the presence or the absence of the clock spectrum line.

Advantageously, the apparatus of the invention includes frequency transposition apparatus placed between the non-linear circuit and the narrow-band filter. In this way, it is possible to detect the presence or the absence of carriers modulated by digital signals at different symbol frequencies.

In an FDMA application, the non-linear circuit is preferably preceded by a band-pass filter for truncating adjacent channels.

The apparatus of the invention is particularly advantageous when it is included in frequency transposition apparatus that includes automatic gain control apparatus placed upstream.

In a preferred application, the signal indicating the presence or the absence of said carrier wave is applied to automatic frequency control apparatus.

The invention also provides a receiver for receiving time-division multiplexed signals, which receiver includes apparatus as described above for delivering a signal indicating the presence of information packets.

The invention further provides a receiver that includes such apparatus for detecting symbol clock frequencies and identifying corresponding carriers. It is thus possible to identify a carrier, and therefore a transmission channel, by detecting the symbol clock frequency corresponding to the channel.

The invention also provides a method of detecting the presence or the absence of a signal carrier wave received by a receiver, the carrier wave being modulated by a digital signal at a symbol clock frequency, the method consisting in detecting the presence of the symbol clock frequency in the received signal so as to indicate the presence of the carrier wave.

BRIEF DESCRIPTION OF THE DRAWINGS

Other characteristics and advantages of the invention will appear on reading the following description of a preferred embodiment given by way of non-limiting example, and with reference to the accompanying drawings, in which:

FIG. 1 is a block diagram of a reception system for satellite transmission, the receiver used including a detector for detecting the presence or the absence of a carrier;

FIG. 2 is a block diagram of detection apparatus of the invention for detecting the presence or the absence of a carrier wave;

MORE DETAILED DESCRIPTION

Figure 3:
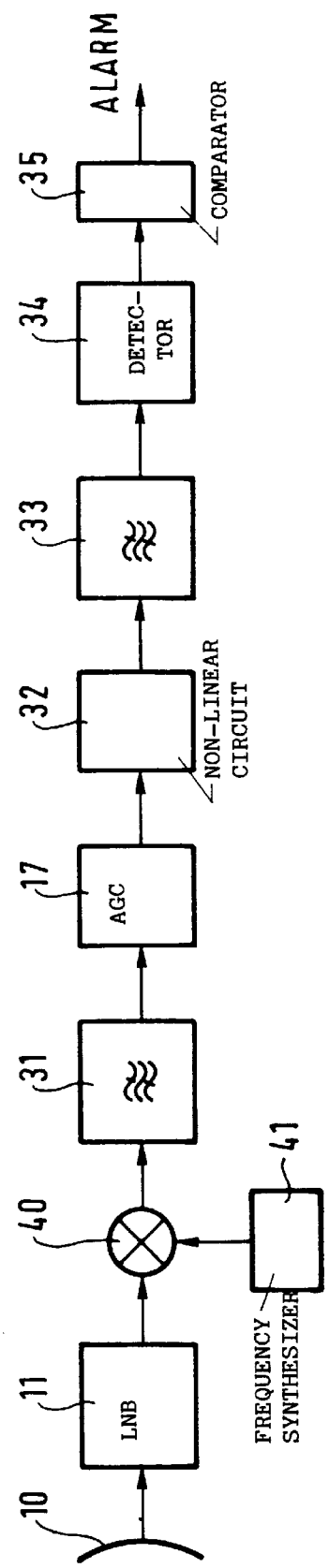
FIG. 3 is a block diagram of another reception system including a detector for detecting the presence of the absence of a carrier.

FIG. 1 is described above with reference to the state of the art.

In FIG. 2, apparatus of the invention for detecting the presence or the absence of a carrier wave is given overall reference 30. This apparatus receives an input signal E and supplies an alarm output signal (ALARM) indicating the presence or the absence of a carrier wave.

The signal E may be the received signal at microwave frequency or said received signal after it has been frequency transposed. If it has been frequency transposed, it may equally well be an intermediate frequency signal or a baseband signal.

When it is an intermediate frequency signal, the signal E may, for example, be the signal output by the AGC apparatus 17 shown in FIG. 1. In which case, the apparatus 30 shown in FIG. 2 replaces the apparatus referenced 21 in FIG. 1.

The signal E is applied to the input of a band-pass filter 31 that is optional. This filter serves to truncate the channels that are adjacent to the channel in question. Such a filter is used in particular when the received signal is of the FDMA type. The signal output from the filter 31 is applied to the input of a non-linear circuit 32, the non-linear circuit supplying in particular a signal whose frequency corresponds to the symbol clock frequency that was used to modulate the carrier on transmission.

Any type of non-linear circuit is suitable: it is possible to use an amplifier operating at saturation, or a squaring circuit, etc. In general, any non-linearity produces a set of spectrum lines (frequency components) in the signal output from the circuit 32, the set including the spectrum line of the symbol clock used on transmission. Any spectrum, regardless of whether it is the spectrum of a microwave signal, an intermediate frequency signal, or a baseband signal, includes the spectrum line of the symbol clock, provided that the carrier is modulated by a digital signal at that symbol frequency.

The output signal from the circuit 32 is applied to a narrow-band filter 33 centered on the frequency of the symbol clock. It is assumed that the symbol clock frequency, i.e. the modulation frequency, is known. At the output of the filter 33, a filtered signal SF is thus obtained corresponding to the symbol clock used on transmission. The filtered signal SF is applied to detection means 34, e.g. constituted by a diode detector, supplying a detection signal SD. In the presence of a carrier at the input of the receiver, the detection signal SD has a high level, whereas in the absence of a carrier, the detection signal has a low level. The detection signal SD is then applied to comparator means 35 for comparing the detection signal SD with an adjustable reference value REF adjusted so as to provide the system with noise immunity.

The output signal from the comparator means 35 constitutes the alarm signal indicating the presence or the absence of the carrier wave.

The main advantage of the invention is that the gain of the apparatus of the invention is large because the bandwidth of the filter 33 may be very small compared with the Nyquist band of the filter used on transmission (3 dB-down band). Moreover, detection of the symbol clock frequency is not generally disturbed by the propagation conditions. For example, the bandwidth of the filter 33 may be about 300 kHz so as to take into account jitter and any Doppler, for a symbol rate of 30 Mbauds in 4-PSK, i.e. for a Nyquist band of 30 MHz. A gain of 20 dB is thus obtained on the signal-to-noise ratio.

If the apparatus of the invention is to be used in a receiver receiving signals modulated at different symbol frequencies, frequency transposition apparatus is placed between the non-linear circuit 32 and the narrow-band filter 33, so that the symbol clock signal remains available upstream of the filter. It is also possible to use a frequency-agile narrow-band filter.

FIG. 3 is a block diagram of another reception system including a detector for detecting the presence or the absence of a carrier.

In addition to the elements already mentioned in the description of FIG. 1, which elements are given the same references, this reception system includes a frequency transposition stage composed by a mixer 40 driven by a frequency synthesizer 41, e.g. for supplying an IF signal at 450 MHz from a signal of frequency approximately equal to 1 GHz. The comparator means 35 supply the alarm signal indicating the presence or the absence of the carrier.

Figure 4:
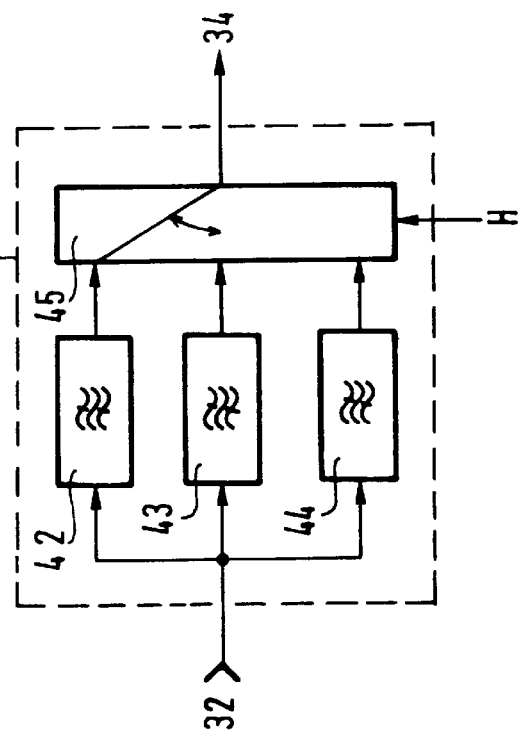
FIG. 4 is a block diagram of a set of filters in parallel followed by a multiplexer, capable of advantageously replacing the narrow-band filter 33 shown in FIG. 3, for detecting symbol clock frequencies and identifying corresponding carriers.

FIG. 4 is a block diagram of a set of filters in parallel followed by a multiplexer, advantageously used to replace the filter 33 shown in FIG. 3, for detecting symbol clock frequencies and identifying the corresponding carriers. In this application, one or more carriers are to be identified, each carrier corresponding to a transmission channel and having its own symbol clock frequency, the symbol clock frequencies being different in the various channels. For example, in a civil application, it is possible to identify which carrier is received on the basis of the corresponding symbol rate.

In this example, a set of three band-pass filters 42, 43, and 44 are used with their inputs being connected together in parallel, the passbands of the filters being identical but centered on different frequencies. The outputs from the filters are applied to a multiplexer 45 having its output connected to the detection means 34. The multiplexer is controlled by a clock signal H. When a symbol rate corresponding to that of a carrier is detected, the clock signal is inhibited (e.g. by means of the alarm signal), and the symbol-rate information is supplied to the multi-rate demodulation means.

Figure 5:
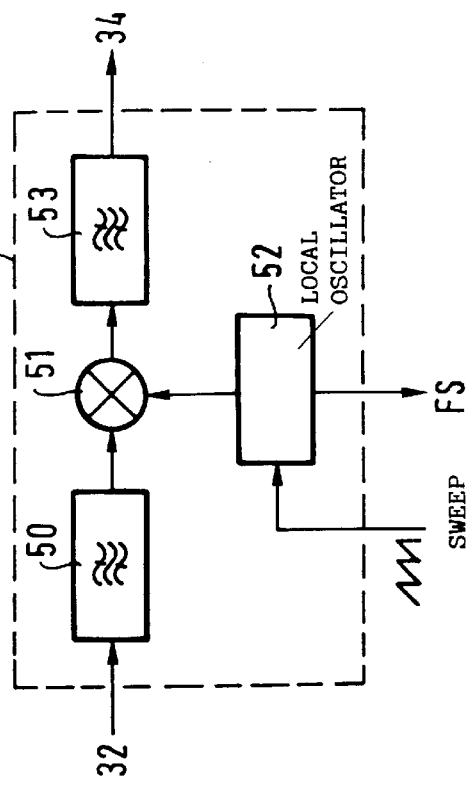
FIG. 5 is a block diagram of a stage capable of replacing the set of filters associated with the multiplexer shown in FIG. 4.

FIG. 5 is a block diagram of a stage that may be used to replace the stage shown in FIG. 4. In this embodiment, a low-pass filter 50 filters out frequencies greater than the greatest expected symbol clock frequency. A frequency transposition stage constituted by a mixer 51 driven by a local oscillator 52 receives the filtered signal. The oscillator 52 receives a frequency sweep signal SWEEP, and the output signal from the mixer 51 is applied to a narrow-band band-pass filter 53, e.g. identical to the filter referenced 33 in FIGS. 2 and 3. The local oscillator 52 supplies a signal FS indication the present symbol clock frequency. When a symbol clock is detected, the sweep signal SWEEP is inhibited. For example, this embodiment may be used in a radio-frequency scanner.

The invention may be used particularly advantageously in TDMA or FDMA receivers in which AGC apparatus is placed upstream. The invention makes it possible to distinguish clearly between noise and the digital spectrum due to modulation at the symbol frequency, for Eb/No ratios of at least 3 dB.

The invention also relates to a method of detecting the presence or the absence of a signal carrier wave received by a receiver, the carrier wave being modulated by a digital signal at a symbol clock frequency, the method consisting in detecting the presence of the symbol clock frequency in the received signal so as to indicate the presence of the carrier wave.

What is claimed is:

1. Apparatus for detecting the presence or the absence of a signal carrier wave received by a receiver, said signal carrier wave being modulated by a digital signal at a symbol clock frequency, said apparatus including:

a non-linear circuit receiving a signal corresponding to the received signal, said non-linear circuit supplying in particular a signal whose frequency corresponds to said symbol clock frequency;

a narrow-band filter centered on said symbol clock frequency and supplying a filtered signal;

detection means for detecting said filtered signal and for supplying a detection signal; and comparator means for comparing said detection signal with a reference value, the output signal from said comparator means constituting a signal indicating the presence or the absence of said carrier wave.

2. Apparatus according to claim 1, including frequency transposition apparatus between said non-linear circuit and said narrow-band filter.

3. Apparatus according to claim 1, wherein said non-linear circuit is preceded by a band-pass filter for truncating adjacent channels in FDMA transmission.

4. Apparatus according to claim 1, wherein it is included in frequency transposition apparatus that includes automatic gain control apparatus placed upstream.

5. Apparatus according to claim 4, wherein said signal indicating the presence or the absence of said carrier wave is applied to automatic frequency control apparatus.

6. A receiver for receiving time-division multiplexed signals, said receiver including apparatus according to claim 1.

7. A receiver, including apparatus according to claim 1 for detecting symbol clock frequencies and identifying corresponding carriers.

8. A receiver according to claim 7, wherein said apparatus includes a frequency transposition stage for sweeping said symbol clock frequencies.

9. A method of detecting the presence or absence of a signal carrier wave received by a receiver, said carrier wave being modulated by a digital signal at a symbol clock frequency, said method consisting in detecting the presence of said symbol clock frequency in the received signal so as to indicate the presence of said carrier wave and detecting the absence of said carrier wave if presence of said symbol clock frequency is not detected.

* * * * *